US011168809B2

(12) United States Patent
Dotson et al.

(10) Patent No.: US 11,168,809 B2
(45) Date of Patent: Nov. 9, 2021

(54) PASSIVE SEQUENTIAL PUMP SYSTEM

(71) Applicant: HALLIBURTON ENERGY SERVICES, INC., Houston, TX (US)

(72) Inventors: Adam Robert Dotson, Houston, TX (US); Dale E. Jamison, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 142 days.

(21) Appl. No.: 16/732,722

(22) Filed: Jan. 2, 2020

(65) Prior Publication Data

US 2021/0207734 A1 Jul. 8, 2021

(51) Int. Cl.
*F16K 31/126* (2006.01)
*F16K 11/065* (2006.01)
*E21B 7/02* (2006.01)
*E21B 34/10* (2006.01)
*F16K 7/10* (2006.01)

(52) U.S. Cl.
CPC .......... *F16K 31/1268* (2013.01); *E21B 7/022* (2013.01); *E21B 34/10* (2013.01); *F16K 7/10* (2013.01); *F16K 11/065* (2013.01)

(58) Field of Classification Search
CPC ...... F16K 31/1268; F16K 11/065; F16K 7/10; F16K 7/07; F16K 7/075; E21B 7/022; E21B 34/10; F04B 43/12; F04B 43/14; F04B 43/0736; F04B 43/0733; F04B 43/073; F04B 45/064; F04B 45/08; F04B 45/085; F04B 45/10; F04B 45/06
USPC .................................. 251/5; 137/627.5, 628
See application file for complete search history.

(56) References Cited

U.S. PATENT DOCUMENTS 2,926,614 A * 3/1960 Rose, Jr. ............... F04B 43/021
417/375
3,305,097 A * 2/1967 Natelson ............. F04B 43/1133
417/414
(Continued)

FOREIGN PATENT DOCUMENTS

GB 2257478 A * 1/1993 ............ F04B 43/021
WO 97042412 A1 11/1997

OTHER PUBLICATIONS

International Search Report, Response & Written Opinion, PCT Application No. PCT/US2020/012063, dated Sep. 25, 2020.

*Primary Examiner* — Craig J Price
*Assistant Examiner* — Andrew J Rost
(74) *Attorney, Agent, or Firm* — Polsinelli PC

(57) ABSTRACT

A passive sequential pump system for use in moving a fluid is provided. The system comprises a plurality of valves. Each valve of the plurality of valves is positioned adjacent to another valve of the plurality of valves. Each of the plurality of valves includes an opening and an inner surface. The inner surface is expandable towards the opening. The system also comprises a conduit defined by the opening of each of the plurality of valves. The system further comprises an air source providing air to each of the plurality of valves and a controller controlling the air source to each of the plurality of valves. The system generates peristaltic motion to move a fluid through the conduit by increasing the air in each of the plurality of valves, thereby correspondingly closing each opening in sequence, peristaltic motion is generated to move a fluid through the conduit.

21 Claims, 7 Drawing Sheets

(56) References Cited

U.S. PATENT DOCUMENTS

| | | | |
|---|---|---|---|
| 4,025,121 A * | 5/1977 | Kleysteuber | B65G 35/005 |
| | | | 406/96 |
| 4,158,530 A | 6/1979 | Bernstein | |
| 4,286,910 A * | 9/1981 | Conrad | F16K 7/10 |
| | | | 100/221 |
| 5,040,955 A * | 8/1991 | Knutson | F04B 43/12 |
| | | | 417/474 |
| 5,573,384 A * | 11/1996 | Ernsberger | A61C 13/12 |
| | | | 417/392 |
| 6,109,888 A | 8/2000 | Marshall | |
| 6,435,840 B1 | 8/2002 | Sharma et al. | |
| 7,141,071 B2 * | 11/2006 | Imran | A61F 2/04 |
| | | | 623/23.64 |
| 7,397,166 B1 * | 7/2008 | Morgan | F04B 43/095 |
| | | | 310/328 |
| 8,241,018 B2 | 8/2012 | Harr | |
| 8,894,391 B2 | 11/2014 | Wolff | |
| 2002/0098098 A1 | 7/2002 | Miesner | |
| 2014/0134002 A1 * | 5/2014 | Brettschneider | F04B 43/073 |
| | | | 417/53 |
| 2015/0093257 A1 | 4/2015 | Lastra | |
| 2015/0240578 A1 | 8/2015 | Duman et al. | |
| 2018/0215549 A1 | 8/2018 | Johnson | |

\* cited by examiner

PASSIVE SEQUENTIAL PUMP SYSTEM

TECHNICAL FIELD

The present disclosure relates generally to pumps used in transporting a fluid. In at least one example, the present disclosure relates to closing an opening of each of a plurality of valves in sequence, thereby generating peristaltic motion to move a fluid.

BACKGROUND

Wellbores are drilled into the earth for a variety of purposes including accessing hydrocarbon bearing formations. A variety of drilling fluids can be used within a wellbore in connection with accessing and extracting such hydrocarbons before, during, or after drilling the wellbore. Drilling fluids can include any type of liquid, such as, but not limited to, water, oil, or diesel and can contain additives. Conventional fluid handling equipment can become plugged by drilling fluids containing additives, thereby reducing performance or causing failure of such equipment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
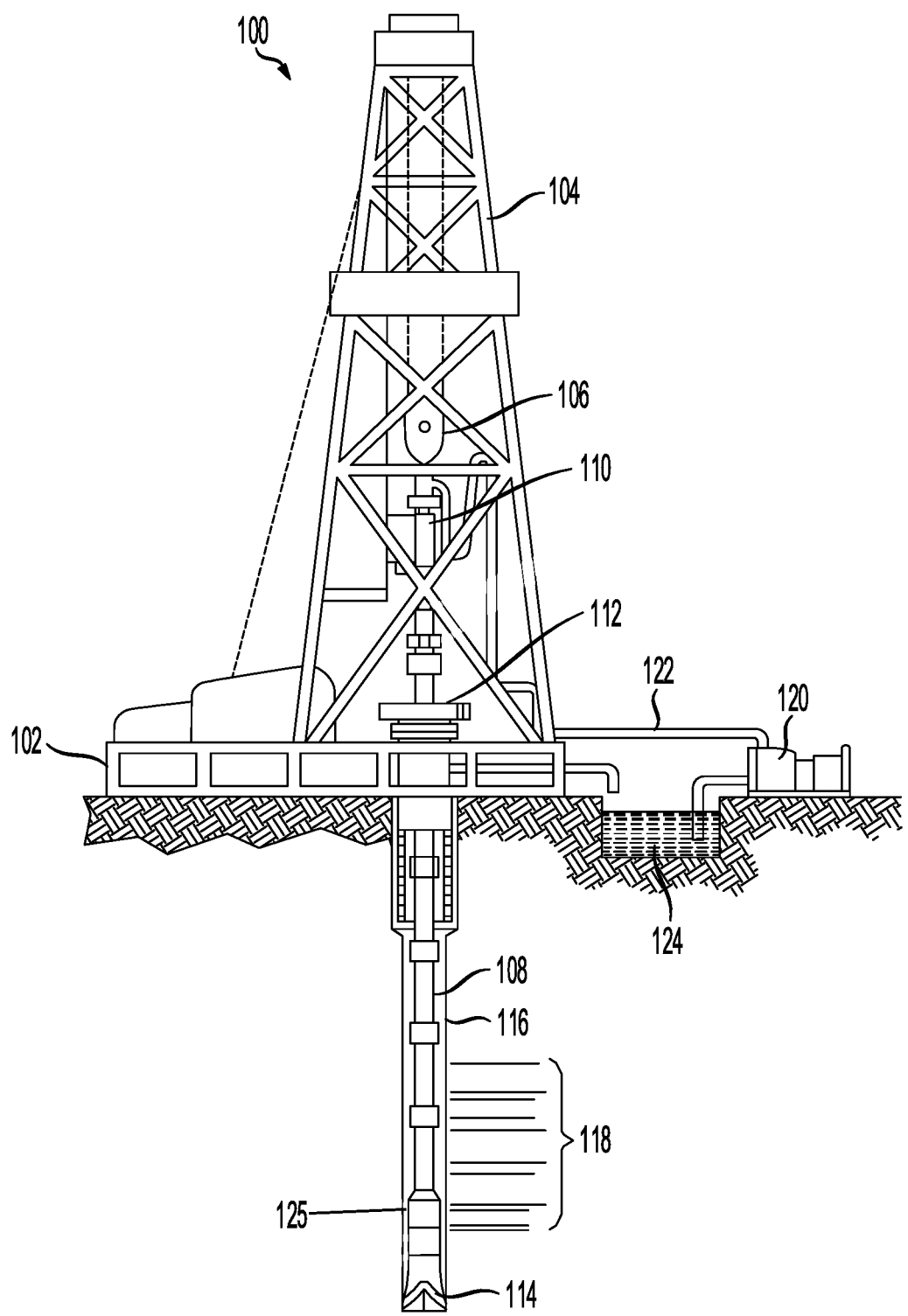
FIG. 1 is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Disclosed are systems and methods for generating a fluid flow using a passive sequential pump.

According to at least one aspect, an example pump system is provided. The system can include a plurality of valves. Each valve of the plurality of valves can be positioned adjacent to another valve of the plurality of valves. Each of the plurality of valves can have an opening and an inner surface. The inner surface of each of the plurality of valves can be expandable towards the opening to decrease a size of the opening. The system can include a conduit defined by the opening of each of the plurality of valves. The system can include an air source providing air to each of the plurality of valves. An increase in air to each of the plurality of valves can the inner surface and decreases the size of the opening. The system can include a controller controlling the air source to each of the plurality of valves. The system can generate peristaltic motion to move a fluid through the conduit by increasing the air in each valve of the plurality of valves in sequence thereby correspondingly closing each opening in sequence.

According to at least one aspect, another example pump system is provided. The system can include an elongate body extending from a first end to a second end. The elongate body can have an outer surface and a bore. The bore can have an inner surface operable to expand towards a center axis of the elongate body to close the bore when air is increased in the elongate body. The system can have a plurality of baffles positioned between the outer surface and the inner surface. The plurality of baffles can define a plurality of inner chambers. The system can have a conduit defined by the bore. The system can have an air source providing air to the elongate body. Increasing the air of the elongate body can close the bore at each of the plurality of inner chambers in sequence. The system can have a controller controlling the air source to the elongate body. The system can generate peristaltic motion to move a fluid through the conduit by increasing the air in the elongate body, thereby correspondingly closing the bore at each of the plurality of inner chambers.

According to at least one aspect, an example method for generating a fluid flow is provided. The method can include receiving air by each of a plurality of valves from an air source. Each of the plurality of valves can be positioned adjacent to another valve of the plurality of valves. Each of the plurality of valves can have an opening and an inner surface. The inner surface can be operable to expand towards the opening and decrease a size of the opening. The method can include controlling an air flow to each of the plurality of valves by a controller. The method can generate peristaltic motion to move a fluid through the conduit by increasing the air in each valve of the plurality of valves in sequence thereby correspondingly closing each opening in sequence.

As follows, the disclosure will provide a more detailed description of the systems, methods, computer-readable media and techniques herein for generating a fluid flow using a passive sequential pump. The disclosure will begin with a description of example systems and environments, as shown in FIG. 1. A description of example methods and technologies for generating a fluid flow using a passive sequential pump, as shown in FIG. 2-5, will then follow. The disclosure concludes with a description of an example computing system architecture, as shown in FIG. 6, which can be implemented for performing computing operations and functions disclosed herein. These variations shall be described herein as the various embodiments are set forth.

The disclosure now turns to FIG. 1, which illustrates a schematic view of a logging while drilling (LWD) wellbore operating environment 100 in accordance with some examples of the present disclosure. As depicted in FIG. 1, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. In the illustrated example, the drilling fluid transports cuttings from the wellbore 116 into the retention pit 124 and aids in maintaining the integrity of the wellbore 116. Various materials can be used for drilling fluid, including oil-based fluids and water-based fluids. The drilling fluid can also include additives to improve well performance, control fluid or circulation loss, and/or provide emulsification. In some examples, the drilling fluid can include additives to plug small holes in the well formations 118.

Figure 2A:
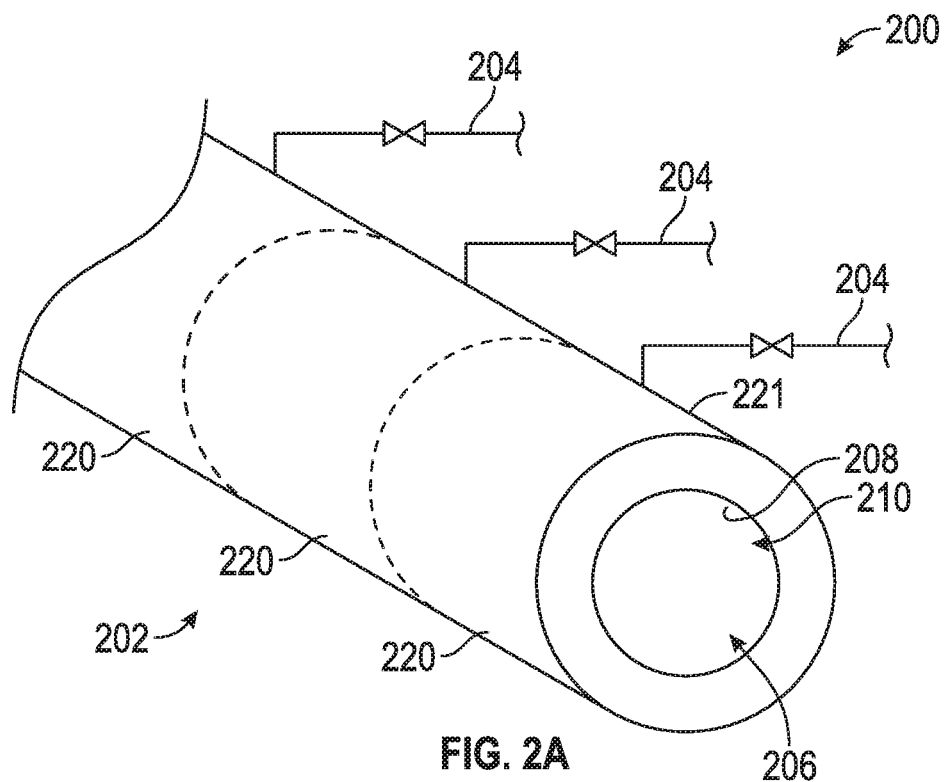
FIG. 2A is an isometric view of a first embodiment of a passive sequential pump.
Figure 2B:
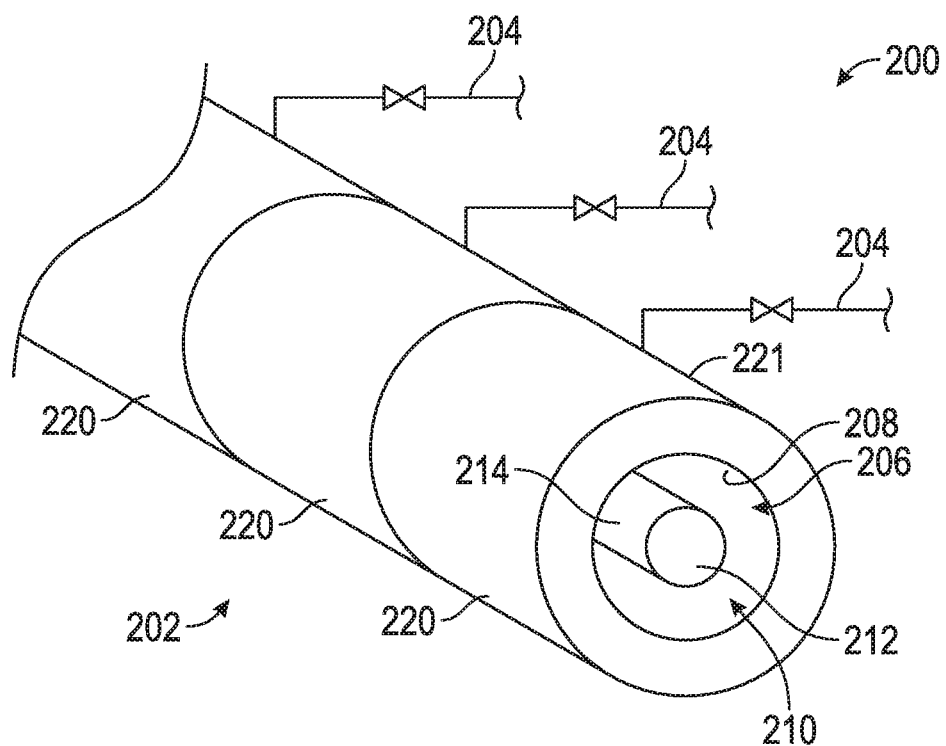
FIG. 2B is an isometric view of the first embodiment of the passive sequential pump with a shaft.
Figure 2C:
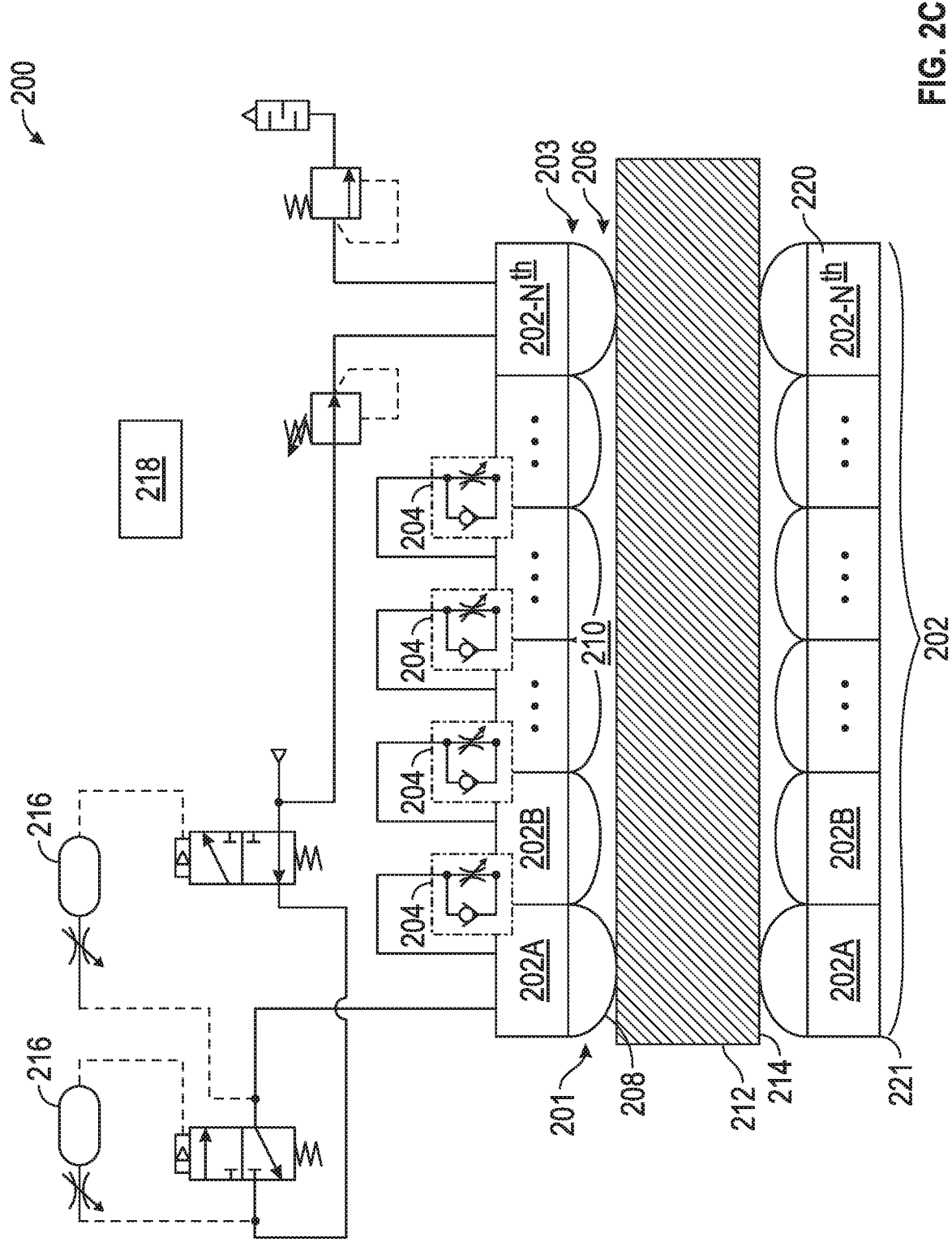
FIG. 2C is a schematic diagram of the first embodiment of the passive sequential pump.

FIGS. 2A-2C are an isometric view of a first embodiment of a passive sequential pump system 200, an isometric view of the system 200 with a shaft 212, and a schematic diagram of the system 200. The system 200 includes an elongate body 221 extending from a first end 201 to a second end 203. The body 221 can be defined by a plurality of valves 202 coupled to a corresponding plurality of air valves 204. In some examples, each of the plurality of valves 202 can be any air flow control mechanism that limits, stops, or controls flow of air to and from the system 200. Each valve of the plurality of valves 202 includes a body 220 positioned adjacent to another body of the plurality of valves 202. Each of the plurality of valves 202 includes an opening 206 and an inner surface 208. The inner surface 208 of each of the plurality of valves 202 can expand towards the opening 206 to decrease a size of the opening 206. The inner surface 208 can be a flexible, elastic, resilient or stretchable material such as latex, rubber, or the like. In other examples, the elongate body 221 may include at least one inflatable seal or at least one movable seal that may expand towards an opening to decrease a size of the opening.

As shown in FIGS. 2A and 2B, the body 220 of each of the plurality of valves 202 is a toroid having a center opening that defines the opening 206. The body 220 of each of the plurality of valves 202 can be other shapes and can additionally define openings 206 of different shapes and sizes. For example, the body 220 can have a cross section of a rectangle, circle, a square, a star, an oval, a hexagon, or the like, and the opening 206 can have a cross section of the same shape or a different shape as the body 220. In other examples, the body 220 can include a plurality of baffles positioned between an outer surface of the body 220 and the inner surface 208. In the same example, each of the plurality of baffles define a chamber in a plurality of chambers.

The system 200 also includes a conduit 210 for receiving a fluid flow. The conduit 210 is generally defined by the opening 206 of each of the plurality of valves 202. In the illustrated example shown in FIG. 2A, the conduit 210 is defined by a bore formed by the opening 206 of each of the plurality of valves 202. In the same example, the conduit 210 can have a centerline extending through a center of the bore and each inner surface 208 of each of the plurality of valves 202 is operable to expand towards the centerline to close the conduit 210. In the illustrated example shown in FIG. 2B, the conduit 210 is defined by an annulus formed between the inner surface 208 of each of the plurality of valves 202 and an outer surface 214 of the shaft 212. In the same example, the inner surface 208 of each of the plurality of valves 202 is operable to expand towards the shaft 212 to close the conduit 210.

It will be appreciated that in other examples, the conduit 210 can have a cross section in the shape of a rectangle, circle, a square, a star, an oval, a hexagon, or any other shape or combination of shapes. For example, the body 220 can include a base surface opposite the inner surface 208 of each of the plurality of valves 202. The base surface can be a solid surface by which the inner surface 208 of each of the plurality of valves 202 expands towards and against. In some examples, the base surface can be flat, thereby forming a conduit 210 with a semi-circular surface extending to a flat surface. In other examples the base surface can further include a pair of side surfaces perpendicular to and extending from the base surface to define a rectangular or square portion of a cross-section of the conduit 210.

The system 200 includes an air source 216 that provides air to each of the plurality of valves 202 and a controller 218 that controls the amount of air provided to each of the plurality of valves 202. The controller 218 can be part of a computing device architecture 600, as described in detail relative to FIG. 6, or can be a separate component. In some examples, the controller 218 includes a separate component in the form of a plurality of sequentially smaller air flow restrictions (e.g., orifices) at an inlet of each of the plurality of valves 202 or other sealing element. The sequentially smaller air flow restrictions may be used separately from the controller 218 and as a standalone controller. In the illustrated example shown in FIGS. 2A-2C, the controller 218 can send a signal to each of the plurality of air valves 204 to increase or decrease the air in each valve of the plurality of valves 202. When the air to each valve of the plurality of valves 202 is increased, the opening 206 correspondingly closes, and conversely, when the air to each valve of the plurality of valves 202 is decreased, the opening 206 correspondingly opens. Generally, by increasing the air in each valve of the plurality of valves 202 in sequence, then decreasing the air in each valve of the plurality of valves 202 in sequence, peristaltic motion is generated to move a fluid (e.g., drilling fluid) through the conduit 210 and will be discussed in detail relative to FIG. 3.

Figure 3:
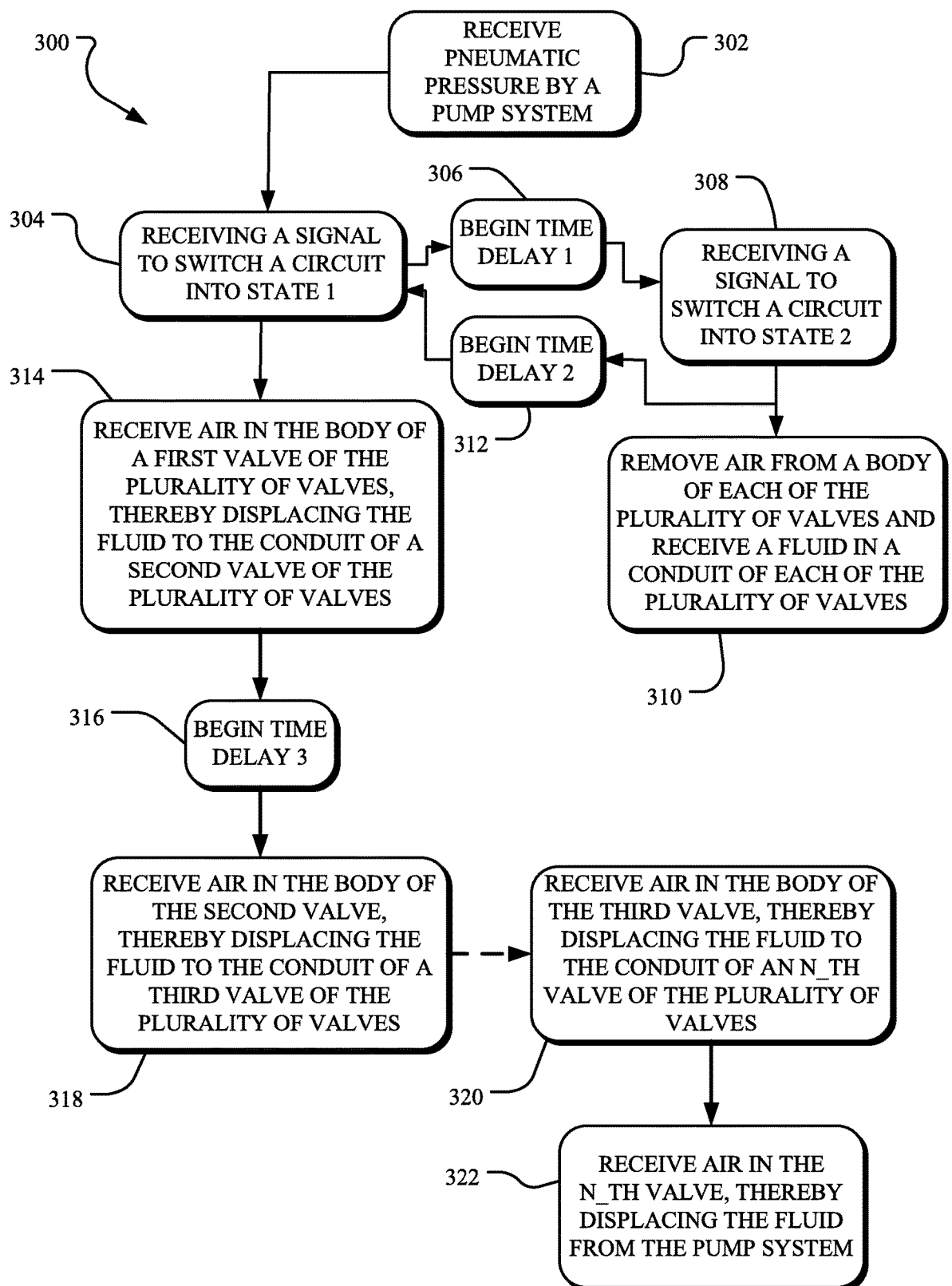
FIG. 3 is a flow chart illustrating a method for generating a fluid flow using the first embodiment of the passive sequential pump.

Having disclosed some example system components and concepts, the disclosure now turns to FIG. 3, which illustrates an example method 300 for FIGS. 2A-2C. For the sake of clarity, the method is described in terms of the system 200, as shown in FIGS. 2A-2C, configured to practice the method. The steps outlined herein are exemplary and can be implemented in any combination thereof, including combinations that exclude, add, or modify certain steps.

In step 302, pneumatic pressure is received by the system 200 from the air source 216. In step 304, a signal is received from the controller 218, for example, by the system 200 to switch a circuit into a first state. In step 306, a time delay 1 is started by the system 200 and in step 308, a signal is received from the controller 218 by the system 200 to switch the circuit into a second state. The second state generally includes moving the opening 206 of each of the plurality of valves 200 from a closed state to an open state, whereas the first state generally includes moving the opening 206 of each of the plurality of valves 200 from the open state to the closed state. In step 310, air is removed from the body 220 of each of the plurality of valves 202 and a fluid is received in the conduit 210 of each of the plurality of valves 202. The air can be removed by an exit valve located on the body 220 of each of the plurality of valves 202 or by an exit valve located within the system 200.

In step 312, a time delay 2 is started by the system 200 to allow for air from each of the plurality of valves 202 to be completely dispersed, and another signal is received by the system 200 to switch the circuit into the first state. In step 314, air is received in the body 220 of the first valve 202A of the plurality of valves 202, as shown in FIG. 2C, thereby displacing the fluid to the conduit 210 of a second valve 202B of the plurality of valves 202. In some examples, the controller 218 can send a signal to the corresponding air valve of the plurality of air valves 204 to move from a closed state to an open state, thereby allowing air to enter the body 220 of the first valve 202A. The fluid is displaced by the inner surface 208 expanding and correspondingly closing the opening 206 of the first valve 202A. In step 316, a time delay 3 is started by the system 200 to allow the opening 206 of the first valve 202A to fully close.

In step 318, air is received in the body 220 of the second valve 202B, as shown in FIG. 2C, thereby displacing the fluid to the conduit 210 of a third valve 202C of the plurality of valves 202. In step 320, the process of steps 314 and 316 are repeated for each valve of the plurality of valves 202 until the N_th valve (e.g., the last valve) of the plurality of valves 202 receives air in the body of the N_th valve, thereby displacing the fluid from the opening 206 of the N_th valve and from the system 200.

In the illustrated method 300, each opening 206 of the plurality of valves 200 can remain closed after air is received in the body 220 of each of the plurality of valves. In other words, each air valve of the plurality of air valves 204 can remain in an open state while pneumatic pressure is supplied to the system 200. The method 300 can be repeated to continuously move fluid through the conduit 210 by continuously moving the plurality of valves 202 from the first state to the second state and from the second state to the first state.

Figure 4:
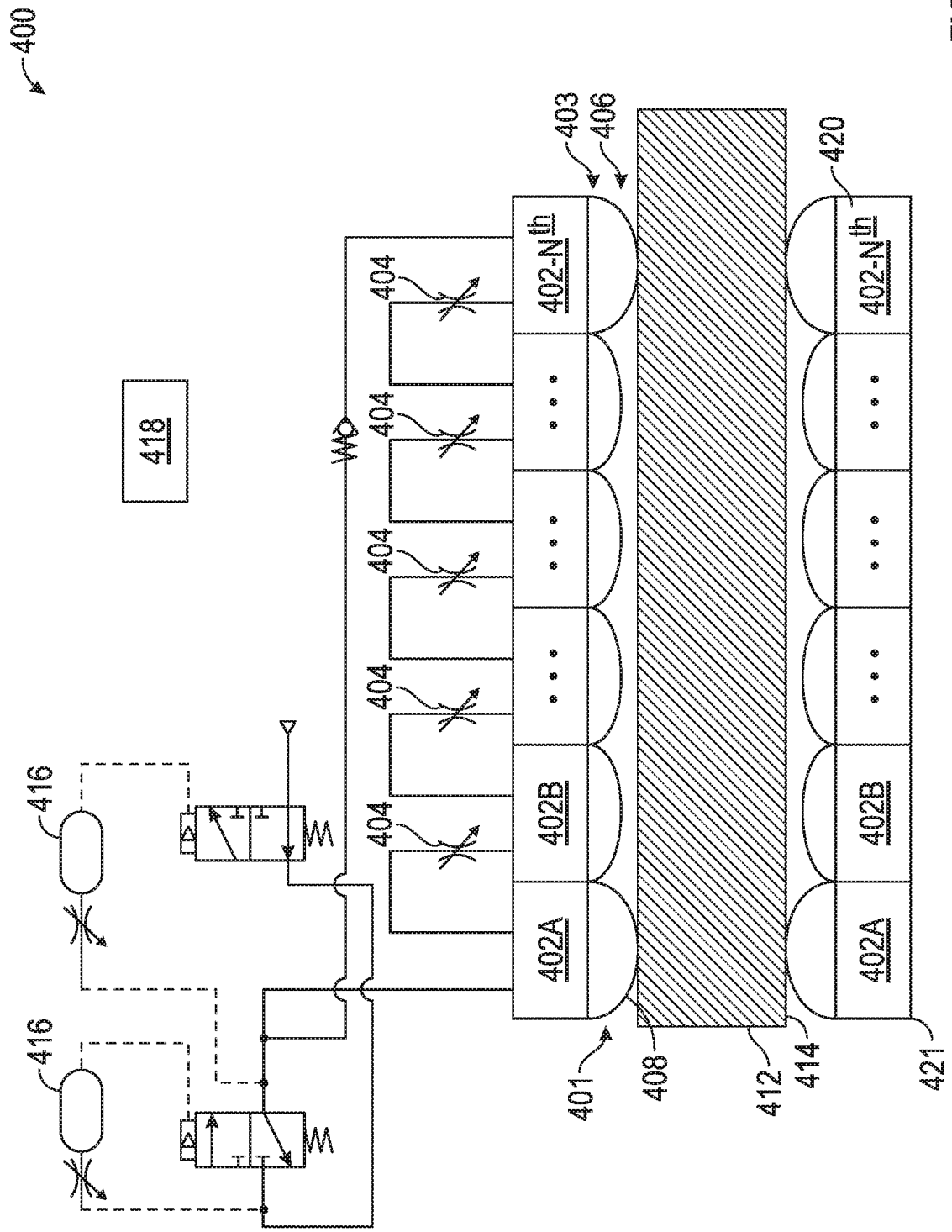
FIG. 4 is schematic diagram of a second embodiment of a passive sequential pump.

FIG. 4 is a schematic diagram of a second embodiment of the passive sequential pump system 400. The system 400 is generally identical to the system 200 as described relative to FIGS. 2A-C, except for a plurality of valves 402 is coupled to a plurality of variable orifice valves 404. The system 400 includes an elongate body 421 extending from a first end 401 to a second end 403. The body 421 can be defined by a plurality of valves 402. In some examples, each of the plurality of valves 402 can be any air flow control mechanism that limits, stops, or controls flow of air to and from the system 400. Each valve of the plurality of valves 402 includes a body 420 positioned adjacent to another body of the plurality of valves 402. Each of the plurality of valves 402 includes an opening 406 and an inner surface 408. The inner surface 408 of each of the plurality of valves 402 can expand towards the opening 406 to decrease a size of the opening 406. The inner surface 408 can be a flexible, elastic, resilient or stretchable material such as latex, rubber, or the like. In other examples, the elongate body 421 may include at least one inflatable seal or at least one movable seal that may expand towards an opening to decrease a size of the opening.

The system 400 also includes a conduit 410 for receiving a fluid flow. The conduit 410 is generally defined by the opening 406 of each of the plurality of valves 202. In the illustrated example, the conduit 410 is defined by an annulus formed between the inner surface 408 of each of the plurality of valves 402 and an outer surface 414 of a shaft 412. In the same example, the inner surface 408 of each of the plurality of valves 402 is operable to expand towards the shaft 412 to close the conduit 410.

It will be appreciated that in other examples, the conduit 410 can have a cross section in the shape of a rectangle, circle, a square, a star, an oval, a hexagon, or any other shape or combination of shapes. For example, the body 420 can include a base surface opposite the inner surface 408 of each of the plurality of valves 402. The base surface can be a solid surface by which the inner surface 408 of each of the plurality of valves 402 expands towards and against. In some examples, the base surface can be flat, thereby forming a conduit 410 with a semi-circular surface extending to a flat surface. In other examples the base surface can further include a pair of side surfaces perpendicular to and extending from the base surface to define a rectangular or square portion of a cross-section of the conduit 410.

The system 400 includes an air source 416 that provides air to each of the plurality of valves 402 and a controller 418 that controls the amount of air provided to each of the plurality of valves 402. The controller 418 can be part of the computing device architecture 600, as described in detail relative to FIG. 6, or can be a separate component. In some examples, the controller 218 includes a separate component in the form of a plurality of sequentially smaller air flow restrictions (e.g., orifices) at an inlet of each of the plurality of valves 402 or other sealing element. The sequentially smaller air flow restrictions may be used separately from the controller 418 and as a standalone controller. In the illustrated, controller 418 can send a signal to each of the plurality of air valves 404 to increase or decrease air in each valve of the plurality of valves 402. When the air to each valve of the plurality of valves 402 is increased, the opening 406 correspondingly closes, and conversely, when the air to each valve of the plurality of valves 402 is decreased, the opening 406 correspondingly opens. Generally, by increasing the air in each valve of the plurality of valves 402 in sequence, then decreasing the air in each valve of the plurality of valves 402 in sequence, peristaltic motion is generated to move a fluid (e.g., drilling fluid) through the conduit 410 and will be discussed in detail relative to FIG. 5.

Figure 5:
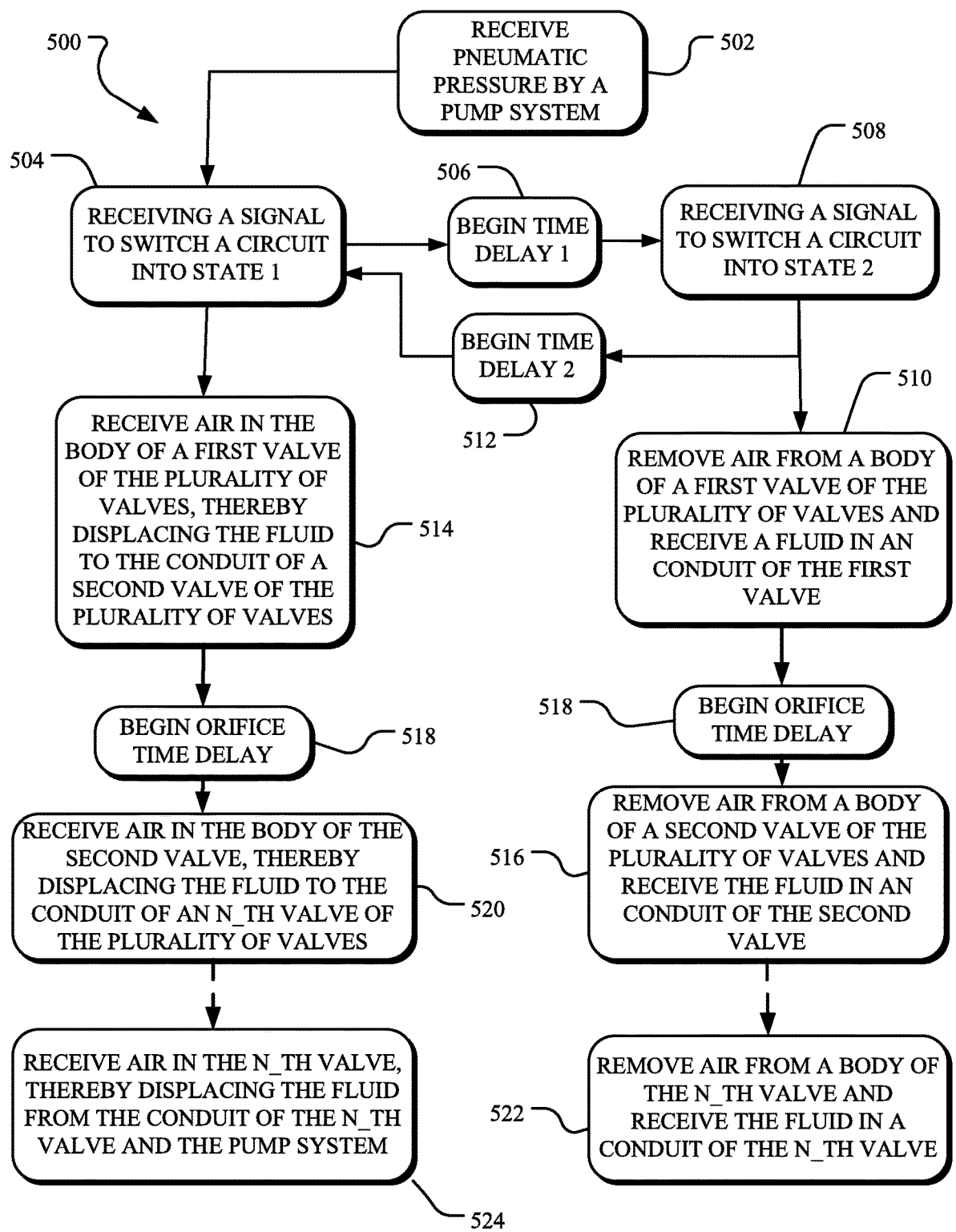
FIG. 5 is a flow chart illustrating a method for generating a fluid flow using the first embodiment of the passive sequential pump.
Figure 6:
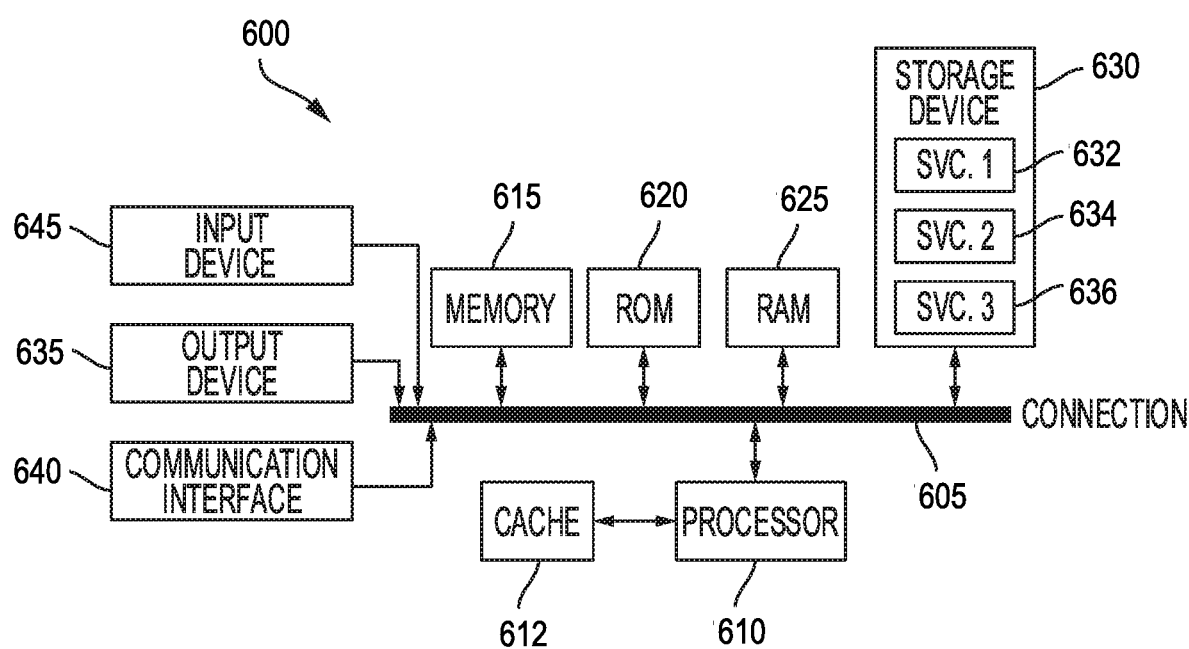
FIG. 6 is a schematic diagram of an example computing device architecture, in accordance with some examples.

Turning to FIG. 5, an example method 500 for use with the system 400 FIG. 4 is illustrated. For the sake of clarity, the method is described in terms of the system 400, as shown in FIG. 4, configured to practice the method. The steps outlined herein are exemplary and can be implemented in any combination thereof, including combinations that exclude, add, or modify certain steps.

In step 502, pneumatic pressure is received by the system 400 from the air source 416. In step 504, a signal is received from the controller 418, for example, by the system 400 to switch a circuit into a first state. In step 506, an orifice time delay is started by the system 400 and in step 508, a signal is received from the controller 418 by the system 400 to switch the circuit into a second state. The second state generally includes moving the opening 506 of each of the plurality of valves 500 from a closed state to an open state, whereas the first state generally includes moving the opening 506 of each of the plurality of valves 500 from the open state to the closed state. In step 510, air is removed from the body 420 of a first valve 402A of each of the plurality of valves 402 and a fluid is received in the conduit 410 of the first valve 402A. The air can be removed by an exit valve located on the body 420 of each of the plurality of valves 402 or by an exit valve located within the system 400.

In step 512, an orifice time delay is started by the system 400 to allow for air from the first valves 402A to fully disperse, and another signal is received by the system 400 to switch the circuit into the first state. In step 514, air is received in the body 420 of the first valve 402A, thereby displacing the fluid to the conduit 510 of a second valve 402B of the plurality of valves 402. The fluid is displaced by the inner surface 408 expanding and correspondingly closing the opening 406 of the first valve 402A. Step 516 occurs simultaneously with step 514 and includes removing air from the body 420 of the second valve 402B and receiving the fluid displaced from the first valve 402A in the conduit 410 of the second valve 402B. In step 518, an orifice time delay is started by the system 400 to allow the opening 406 of the first valve 402A to fully close and for the opening 406 of the second valve 402B to fully open and receive the displaced fluid.

In steps 520, 522, and 524, the process of steps 514, 516, and 518 are repeated for each valve of the plurality of valves 402 until the N_th valve (e.g., the last valve) is reached. In step 520, a body of a prior valve of the plurality of valves 402 receives air, thereby displacing the fluid to the conduit 410 of the N_th valve. Step 522 occurs simultaneously with step 520 and includes removing air from the body 420 of the N_th valve and receiving the fluid displaced from the prior valve in the conduit 410 of the second valve 402B. In step 524, air is received in the body of the N_th valve, thereby displacing the fluid from the conduit 410 of the N_th valve and from the system 400. In the method 500, each opening 406 of the plurality of valves 402 can be opened, then closed as an opening 406 of an adjacent valve of the plurality of valves 402 opens. The method 500 can be repeated to continuously move fluid through the conduit 410 by continuously and sequentially moving each of the plurality of valves 402 from the first state to the second state and from the second state to create a pulsating movement. It will be appreciated that the plurality of valves 402 can be moved from the first state to the second state and vice versa in any combination to generate any type of movement.

The systems 200, 400 described above can be used in a variety of settings and applications. For example, the systems 200, 400 can be used to transport fluids with high shear rates that can be difficult to move by conventional pumping systems. Further, the systems 200, 400 can transport fluids with additives without risk of damage to the system 200, 400, as the conduit is devoid of components (e.g., motors, electronics, etc.) that can be damaged by settling solids. In some examples, the systems 200, 400 can be devoid of any electronics.

Having disclosed example systems, methods, and technologies for generating a fluid flow using a passive sequential pump, the disclosure now turns to FIG. 6, which illustrates an example computing device architecture 600 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 6 illustrates an example computing device architecture 600 of a computing device which can implement the various technologies and techniques described herein. For example, the computing device architecture 600 can implement the system 200 shown in FIG. 2 and perform various steps, methods, and techniques disclosed herein. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 can be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the processor design. The processor 610 can be a self-contained system, containing multiple cores or processors, a bus, memory controller, cache, etc. A multi-core processor can be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art, such as a display, projector, television, speaker device, etc. In some instances, multimodal computing devices can enable a user to provide multiple types of input to communicate with the computing device architecture 600. The communications interface 640 can generally govern and manage the user input and computing device output. There is no restriction on operating on any particular hardware arrangement and therefore the basic features here can easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include services 632, 634, 636 for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions can be, for example, binaries, intermediate format instructions such as assembly language, firmware, source code, etc. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts can be otherwise variously embodied and employed, and that the appended claims are intended to be construed to include such variations, except as limited by the prior art. Various features and aspects of the above-described subject matter can be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods can be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein can be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application.

The techniques described herein can also be implemented in electronic hardware, computer software, firmware, or any combination thereof. Such techniques can be implemented in any of a variety of devices such as general purposes computers, wireless communication device handsets, or integrated circuit devices having multiple uses including application in wireless communication device handsets and other devices. Any features described as modules or components can be implemented together in an integrated logic device or separately as discrete but interoperable logic devices. If implemented in software, the techniques can be realized at least in part by a computer-readable data storage medium comprising program code including instructions that, when executed, performs one or more of the method, algorithms, and/or operations described above. The computer-readable data storage medium can form part of a computer program product, which can include packaging materials.

The computer-readable medium can include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, can be realized at least in part by a computer-readable communication medium that carries or communicates program code in the form of instructions or data structures and that can be accessed, read, and/or executed by a computer, such as propagated signals or waves.

Other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "coupled" is defined as connected, whether directly or indirectly through intervening components, and is not necessarily limited to physical connections. The connection can be such that the objects are permanently connected or releasably connected.

Although a variety of information was used to explain aspects within the scope of the appended claims, no limitation of the claims should be implied based on particular features or arrangements, as one of ordinary skill would be able to derive a wide variety of implementations. Further and although some subject matter can have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Statements of the disclosure include:

Statement 1: A system comprising a plurality of valves, each valve of the plurality of valves positioned adjacent to another valve of the plurality of valves, each of the plurality of valves having an opening and an inner surface, the inner surface expandable towards the opening to decrease a size of the opening; a conduit defined by the opening of each of the plurality of valves; an air source providing air to each of the plurality of valves, wherein increasing the air to each of the plurality of valves expands the inner surface and decreases the size of the opening; and a controller controlling the air source to each of the plurality of valves, wherein when the air in each valve of the plurality of valves is increased in sequence thereby correspondingly closing each opening in sequence, peristaltic motion is generated to move a fluid through the conduit.

Statement 2: A system according to Statement 1, wherein a body of each of the plurality of valves is a toroid having a center opening, the center opening defining each opening.

Statement 3: A system according to any of Statements 1 and 2, wherein the conduit is a bore defined by each center opening of each of the plurality of valves, the conduit having a centerline extending through each center opening, and wherein each inner surface is operable to expand towards the centerline to close the bore.

Statement 4: A system according to any of Statements 1 through 3, further comprising a shaft extending through the bore.

Statement 5: A system according to any of Statements 1 through 4, wherein the conduit is defined by an annulus formed between the shaft and the inner surface of each of the plurality of valves, wherein the when the air is increased in sequence in each valve of the plurality of valves thereby closing the annulus.

Statement 6: A system according to any of Statements 1 through 5, wherein peristaltic motion is maintained by decreasing the air in each valve of the plurality of valves in sequence after increasing the air in each valve of the plurality of valves in sequence.

Statement 7: A system according to any of Statements 1 through 6, further comprising a controller controlling the air source to each of the plurality of valves.

Statement 8: A system according to any of Statements 1 through 7, further comprising a plurality of sequentially smaller air flow restrictions each positioned at a corresponding inlet of each of the plurality of valves.

Statement 9: A system according to any of Statements 1 through 8, further comprising a base surface opposite the inner surface of each of the plurality of valves.

Statement 10: A system according to any of Statements 1 through 9, wherein the conduit is further is formed by the base surface and the inner surface of each of the plurality of valves, and the conduit is closed by each inner surface expanding towards the flat surface when the air is increased.

Statement 11: A system according to any of Statements 1 through 10, further comprising two side surfaces positioned on opposite sides of the base surface, and wherein the conduit is further defined by the base surface, the two side surfaces, and each inner surface.

Statement 12: A pump system comprising an elongate body extending from a first end to a second end and having an outer surface and a bore, the bore having an inner surface operable to expand towards a center axis of the elongate body to close the bore when air is increased in the elongate body; a plurality of baffles positioned between the outer surface and the inner surface, the plurality of baffles defining a plurality of inner chambers; a conduit defined by the bore; an air source providing air to the elongate body, wherein an increase in the air of the elongate body closes the bore at each of the plurality of inner chambers in sequence; and a controller controlling the air source to the elongate body, wherein when the air in the elongate body is increased thereby correspondingly closing the bore at each of the plurality of inner chambers, peristaltic motion is generated to move a fluid through the conduit.

Statement 13: A system according to Statement 12, wherein the peristaltic motion is maintained by decreasing the air the elongate body after increasing the air in elongate body.

Statement 14: A system according to any of Statements 12 and 13, further comprising a shaft extending through the bore.

Statement 15: A system according to any of Statements 12 through 14, wherein the conduit is defined by an annulus formed between the shaft and the inner surface, wherein a volume of the annulus is reduced by the inner surface expanding towards the shaft when the air is increased.

Statement 16: A method for generating a fluid flow, the method comprising receiving air by each of a plurality of valves from an air source, each of the plurality of valves positioned adjacent to another valve of the plurality of valves, each of the plurality of valves having an opening and an inner surface, the inner surface operable to expand towards the opening and decrease a size of the opening; and controlling an air flow to each of the plurality of valves by a controller, wherein when the air in each valve of the plurality of valves is increased in sequence thereby correspondingly closing each opening in sequence, peristaltic motion is generated to move a fluid through the conduit.

Statement 17: A method according to Statement 16, wherein a body of each of the plurality of valves is a toroid having a center opening, the center opening defining each opening.

Statement 18: A method according to any of Statements 16 or 17, wherein the conduit is a bore defined by the opening of each of the plurality of valves, the conduit having a centerline extending through a center of each opening, and wherein each inner surface is operable to expand towards the centerline to close the bore.

Statement 19: A method according to any of Statements 16 through 18, wherein a shaft extends through the bore.

Statement 20: A method according to any of Statements 16 through 19, wherein the conduit is defined by an annulus formed between the shaft and the inner surface of each of the plurality of valves, wherein a volume of the annulus is reduced by the inner surface of each of the plurality of valves expanding towards the shaft when the air is increased.

What is claimed is:

1. A method for generating a fluid flow, the method comprising:
   receiving air by each of a plurality of valves, each valve of the plurality of valves positioned adjacent to another valve of the plurality of valves, each of the plurality of valves having an opening and an inner surface, the inner surface being expandable towards the opening to decrease a size of the opening, wherein a conduit is defined by the opening of each of the plurality of valves, wherein a plurality of sequentially smaller air flow restrictions are each positioned at a corresponding inlet of each of the plurality of valves; and
   controlling an air flow to each of the plurality of valves, wherein increasing the air to each of the plurality of valves expands the inner surface and decreases the size of the opening, and wherein, when the air in each valve of the plurality of valves is increased in sequence thereby correspondingly closing each opening in sequence, peristaltic motion is generated to move a fluid through the conduit.

2. The method of claim 1, wherein a body of each of the plurality of valves is a toroid having a center opening, the center opening defining each opening.

3. The method of claim 2, wherein the conduit is a bore defined by each center opening of each of the plurality of valves, the conduit having a centerline extending through each center opening, and wherein each inner surface is operable to expand towards the centerline to close the bore.

4. The method of claim 3, wherein a shaft extends through the bore.

5. The method of claim 4, wherein the conduit is defined by an annulus formed between the shaft and the inner surface of each of the plurality of valves, wherein the when the air is increased in sequence in each valve of the plurality of valves thereby closing the annulus.

6. The method of claim 1, wherein peristaltic motion is maintained by decreasing the air in each valve of the plurality of valves in sequence after increasing the air in each valve of the plurality of valves in sequence.

7. The method of claim 1, wherein controlling air flow comprises controlling an air flow via a controller.

8. The method of claim 1, further comprising providing a base surface opposite the inner surface of each of the plurality of valves.

9. The method of claim 8, wherein the conduit is further is formed by the base surface and the inner surface of each of the plurality of valves, and the conduit is closed by each inner surface expanding towards the base surface when the air is increased.

10. The method of claim 9, further comprising providing two side surfaces positioned on opposite sides of the base surface, and wherein the conduit is further defined by the base surface, the two side surfaces, and each inner surface.

11. A pump system comprising:
   a plurality of valves, each valve of the plurality of valves positioned adjacent to another valve of the plurality of valves, each of the plurality of valves having an opening and an inner surface, the inner surface being expandable towards the opening to decrease a size of the opening;
   a conduit defined by the opening of each of the plurality of valves;
   an air source providing air to each of the plurality of valves, wherein increasing the air to each of the plurality of valves expands the inner surface and decreases the size of the opening; and
   a plurality of sequentially smaller air flow restrictions each positioned at a corresponding inlet of each of the plurality of valves, wherein, when the air in each valve of the plurality of valves is increased in sequence thereby correspondingly closing each opening in sequence, peristaltic motion is generated to move a fluid through the conduit.

12. The system of claim 11, wherein a body of each of the plurality of valves is a toroid having a center opening, the center opening defining each opening.

13. The system of claim 12, wherein the conduit is a bore defined by each center opening of each of the plurality of valves, the conduit having a centerline extending through each center opening, and wherein each inner surface is operable to expand towards the centerline to close the bore.

14. The system of claim 13, further comprising a shaft extending through the bore.

15. The system of claim 14, wherein the conduit is defined by an annulus formed between the shaft and the inner surface of each of the plurality of valves, wherein the when the air is increased in sequence in each valve of the plurality of valves thereby closing the annulus.

16. The system of claim 11, wherein peristaltic motion is maintained by decreasing the air in each valve of the plurality of valves in sequence after increasing the air in each valve of the plurality of valves in sequence.

17. The system of claim 11, further comprising a controller controlling the air source to each of the plurality of valves.

18. The system of claim 11, further comprising a base surface opposite the inner surface of each of the plurality of valves.

19. The system of claim 18, wherein the conduit is further is formed by the base surface and the inner surface of each of the plurality of valves, and the conduit is closed by each inner surface expanding towards the base surface when the air is increased.

20. The system of claim 19, wherein the base surface is flat.

21. The system of claim 18, further comprising two side surfaces positioned on opposite sides of the base surface, and wherein the conduit is further defined by the base surface, the two side surfaces, and each inner surface.

* * * * *